(12) United States Patent
He

(10) Patent No.: US 8,300,103 B2
(45) Date of Patent: Oct. 30, 2012

(54) OPTICAL TESTING APPARATUS AND TESTING METHOD THEREOF

(75) Inventor: Jin-Min He, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 199 days.

(21) Appl. No.: 12/909,959

(22) Filed: Oct. 22, 2010

(65) Prior Publication Data

US 2011/0285857 A1  Nov. 24, 2011

(30) Foreign Application Priority Data

May 24, 2010 (CN) .......................... 2010 1 0181077

(51) Int. Cl.
*H04N 17/00* (2006.01)
*H04N 17/02* (2006.01)
*G01K 1/08* (2006.01)
*G01K 1/14* (2006.01)
*G01K 13/00* (2006.01)

(52) U.S. Cl. .......................... 348/187; 348/180; 374/141

(58) Field of Classification Search ................ 348/180, 348/187, 189; 374/133, 141, 208
See application file for complete search history.

(56) References Cited

U.S. PATENT DOCUMENTS

| | | | | |
|---|---|---|---|---|
| 5,136,388 A | * | 8/1992 | Sano et al. | 348/187 |
| 6,606,116 B1 | * | 8/2003 | Poynter | 348/189 |
| 6,717,625 B1 | * | 4/2004 | Thielemans | 348/745 |
| 6,987,577 B2 | * | 1/2006 | Wengender | 358/1.14 |
| 7,200,497 B2 | * | 4/2007 | Wang et al. | 702/57 |
| 7,234,863 B2 | * | 6/2007 | Yu | 374/141 |
| 7,999,850 B2 | * | 8/2011 | Wang et al. | 348/181 |
| 2003/0053142 A1 | * | 3/2003 | Wengender | 358/437 |
| 2003/0179418 A1 | * | 9/2003 | Wengender et al. | 358/437 |
| 2005/0243286 A1 | * | 11/2005 | Kobayashi | 353/69 |

* cited by examiner

*Primary Examiner* — Brian Yenke
(74) *Attorney, Agent, or Firm* — Altis Law Group, Inc.

(57) ABSTRACT

An optical testing apparatus can be operated according to a testing method to test quality of an imaging module of an electronic device. The optical testing apparatus includes a projector, a temperature control device, a processor, and a controller. The controller can control the imaging module to capture an image from the projector and transmit the captured image to the processor. The processor processes the captured image to determine the quality of the imaging module.

8 Claims, 2 Drawing Sheets

OPTICAL TESTING APPARATUS AND TESTING METHOD THEREOF

BACKGROUND

1. Technical Field

The present disclosure relates to an optical testing apparatus and a testing method thereof.

2. Description of the Related Art

Portable electronic devices such mobile phones generally include imaging modules for capturing images. The imaging module may heat up to a higher temperature over long periods of continuous use. If the imaging module fails to operate normally at higher temperatures, the imaging quality of the imaging module may be badly affected. Accordingly, it is necessary to provide an optical testing apparatus to implement the imaging quality testings of the image modules at higher temperatures during manufacturing.

Therefore, there is room for improvement within the art.

BRIEF DESCRIPTION OF THE DRAWINGS

Many aspects of the present optical testing apparatus can be better understood with reference to the following drawings. The components in the drawings are not necessarily drawn to scale, the emphasis instead being placed upon clearly illustrating the principles of the present optical testing apparatus. Moreover, in the drawings, like reference numerals designate corresponding parts throughout the several views.

DETAILED DESCRIPTION

Optical testing apparatuses according to the embodiments can be adjusted from a normal temperature to a higher temperature, and can test the working property of the components of an imaging module for electronic devices at temperature higher than ambient temperature. The higher temperature may be selected from a temperature range such as from about 40° C. to about 60° C. The normal temperature may be selected from a temperature range such as from about 20° C. to about 40° C.

Figure 1:
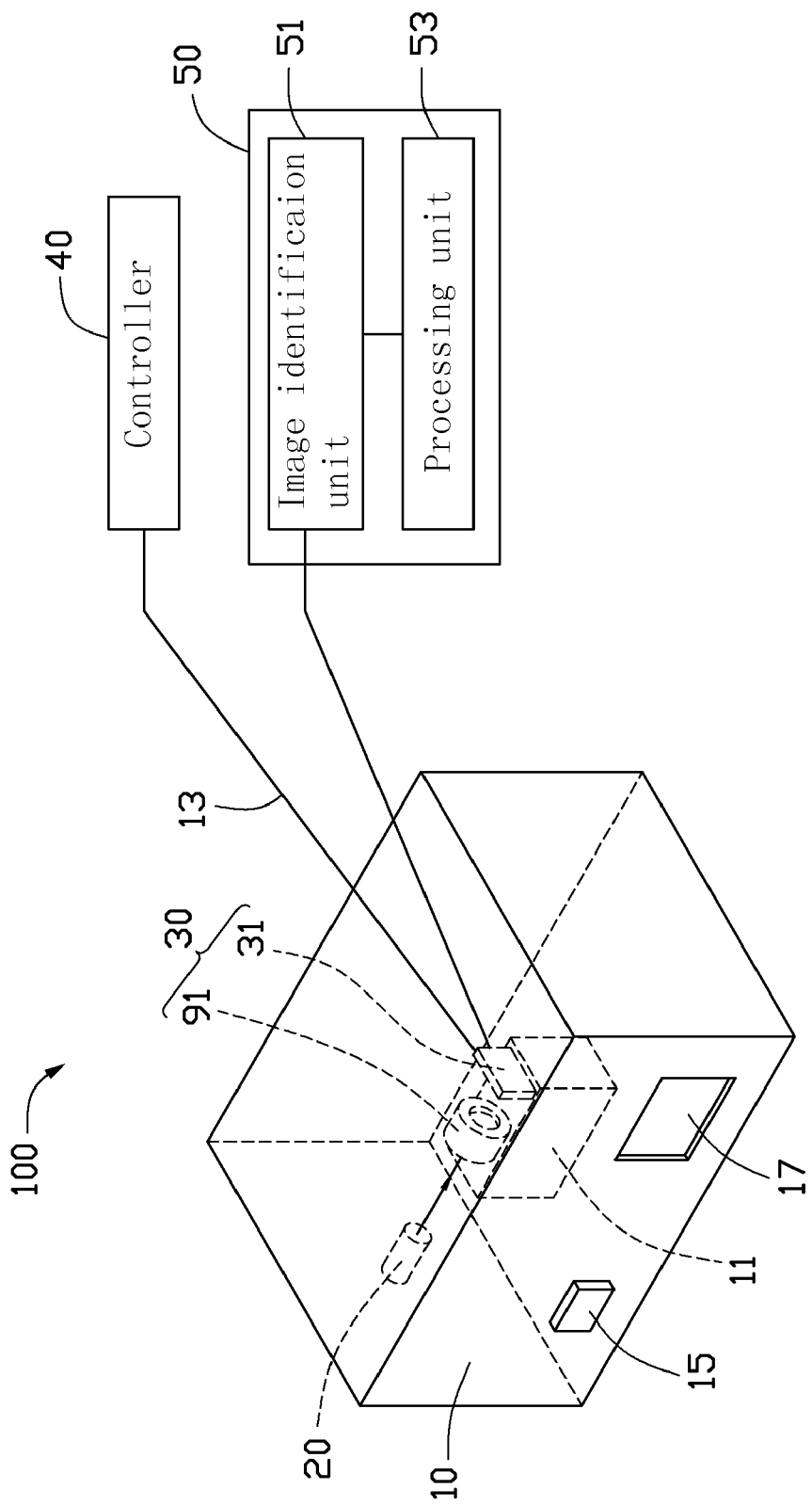
FIG. 1 is a schematic view of an optical testing apparatus of a first embodiment for testing a lens module of an imaging module.

FIG. 1 shows an optical testing apparatus 100 according to a first embodiment for testing the working property of a lens module 91 of the imaging module 30 at a higher than ambient temperature. The optical testing apparatus includes a temperature control device 10, a projector 20, an image sensor 31, a controller 40, and a processor 50. The temperature control device 10 receives the lens module 91 for creating a simulated higher than ambient temperature. As for the lens module 91, the simulated environment is analog with a real working environment. The projector 20 can provide images for the lens module 91 and the image sensor 31. The image sensor 31 works with the lens module 91 to capture images of the projector 20. The processor 50 and the controller 40 electronically connect to the image sensor 31.

The temperature control device 10 is a temperature adjustable box made of opaque materials. The temperature control device 10 may be opened to pass the lens module 91 into the inside space, and may be closed to seal the inside space completely from the outside. The temperature control device 10 includes a frame 11, cables 13, a temperature adjuster 15, and a temperature indicator 17. The frame 11 secures the lens module 91. The cables 13 are used to electronically connect the image sensor 31 to the controller 40 and processor 50. The temperature adjuster 15 can adjust the ambient temperature under which the lens module 91 will operate during the test. The temperature indicator 17 can show the actual temperature of the lens module 91.

The projector 20 may be attached on the inside wall of the temperature control device 10 and directly align with the lens module 91. The projector 20 can project images to the lens module 91 for the lens module 91 to capture.

The image sensor 31 can normally operate at a higher temperature. The image sensor 31 is secured to the frame 11 and is aligned with the lens module 91. The lens module 91 is positioned between the projector 20 and the image sensor 31.

The controller 40 is positioned at the outside of the temperature control device 10. The controller 40 is for controlling the image capturing of the imaging module 30. The captured image from the projector 20 can be transmitted through the cable 13 to the processor 50.

The processor 50 includes an image identification unit 51 and a processing unit 53 electronically connected to the image identification unit 51. The cable 13 electronically connects the image identification unit 51 to the image sensor 31. The image identification unit 51 can identify resolution of the captured images from the projector 20 by the lens module 91 and the image sensor 31. The identified resolution can be further transmitted to the processing unit 53. The processing unit 53 defines a standard resolution and a qualification tolerance. The standard resolution can be determined by identifying the image resolution of the captured images from the projector 20 by the imaging module 30 when the temperature control device 10 is controlled to be normal temperature.

The processing unit 53 can compare the identified resolution with the standard resolution. If the value of the difference between the identified resolution and the standard resolution exceeds the range of the qualification tolerance, the lens module 91 may be unqualified. If the value falls within the range of the qualification tolerance, the lens module 91 may be qualified.

During testing, the projector 20, the lens module 91, and the image sensor 31 may be aligned in a line. The temperature control device 10 is started and the temperature adjuster 15 adjusts the temperature of the temperature control device 10 to a desired higher temperature. The projector 20 projects an image on the lens module 91. When the temperature indicator 17 displays the temperature is higher and reaches the predetermined temperature for the lens module 91, the controller 40 controls the imaging module 30 to capture the image from the projector 20 through the lens module 91. The image sensor 31 transmits the captured image to the processor 50. The image identification unit 51 identifies the image resolution of the captured image and transmits the identified image resolution to the processing unit 53. The processing unit 53 processes the identified image resolution to determine whether the lens module 91 can qualify or not.

Figure 2:
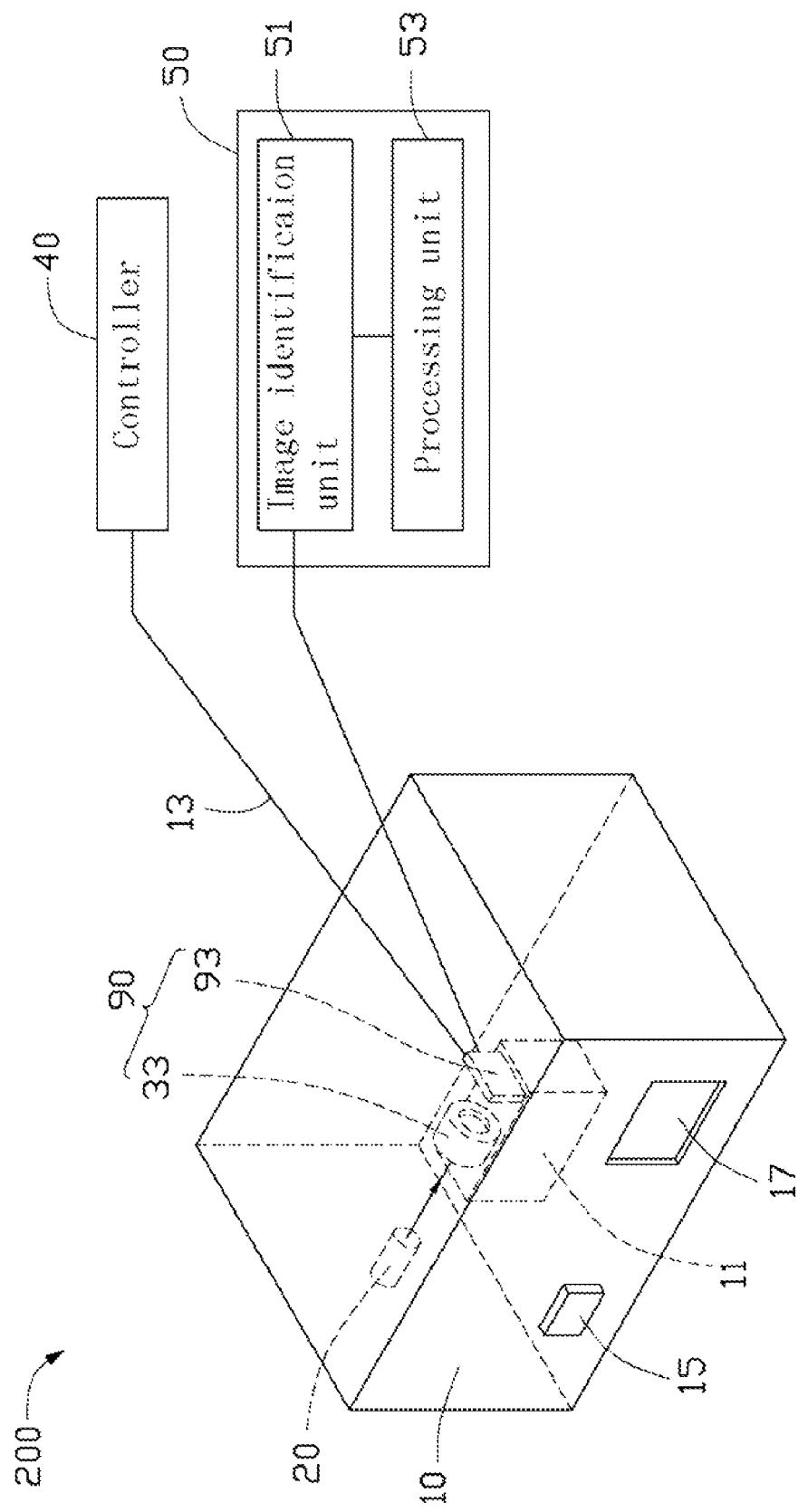
FIG. 2 is schematic view of an optical testing apparatus of a second embodiment for testing an image sensor of an imaging module.

FIG. 2 shows another optical testing apparatus 200 according to a second embodiment. The optical testing apparatus 200 includes the same temperature control device 10, the same projector 20, the same controller 40 and the same processor 50 as the optical testing apparatus 100 of the first embodiment. The testing principle and the structure of the optical testing apparatus 200 are substantially the same as the optical testing apparatus 100. The main difference is that the optical testing apparatus 200 is for testing the working property of an image sensor 93 of the imaging module 90 at a higher temperature. The imaging module 90 further includes a lens module 33 corresponding to the image sensor 93, and the lens module 33 can normally work at a higher temperature. The optical testing apparatus 200 works the same way as the optical testing apparatus 100 to if test the image sensor 93 qualifies or not.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An optical testing apparatus for testing the quality of an imaging module of an electronic device, the imaging module comprising a lens module and an image sensor, the image sensor qualified at a predetermined temperature higher than ambient temperature, the lens module required to be tested by the optical testing apparatus, the optical testing apparatus comprising:
   a projector directly facing with the lens module, the projection, the lens module and the image sensor aligning in a line, the projector for projecting images on the lens module for the lens module to capture;
   a temperature control device made of opaque material and sealing an inside space completely from an outside, the projector and the imaging module being received in the inside space, the projector attached on an inside wall of the temperature control device, the temperature control device including a temperature adjuster and a temperature indicator, the temperature adjuster adjusting the ambient temperature and the temperature indicator showing the actual temperature of the lens module;
   a processor electronically connected to the image sensor;
   a controller electronically connected to the image sensor and controlling the imaging module to capture image and transmitting the captured image to the processor when the temperature indicator displaying the actual temperature of the lens module to reach the predetermined temperature, the processor configured for processing the captured image to determine the quality of the imaging module required to be tested.

2. The optical testing apparatus as claimed in claim 1, wherein the processor comprises an image identification unit configured for identifying the image resolution of the captured image.

3. The optical testing apparatus as claimed in claim 2, wherein the processor further comprises a processing unit electronically connected to the image identification unit, the processing unit processing the identified image resolution to determine the quality of the imaging module.

4. The optical testing apparatus as claimed in claim 3, wherein the processing unit is defined with a standard resolution and a qualification tolerance, the processing unit calculates value of the difference between the standard resolution and the identified resolution, and compares the calculated value with the qualification tolerance.

5. The optical testing apparatus as claimed in claim 4, wherein if the calculated value exceeds the range of the qualification tolerance, the imaging module is unqualified; if the calculated value falls within the range of the qualification tolerance, the imaging module is unqualified.

6. The optical testing apparatus as claimed in claim 4, wherein the standard resolution is determined by identifying the image resolution of the captured image when the temperature control device is under the normal temperature.

7. The optical testing apparatus as claimed in claim 1, wherein the processor and the controller are positioned at the outside of the temperature control device.

8. The optical testing apparatus as claimed in claim 1, wherein the temperature control device comprises a frame, and cables, the frame secures the imaging module, the cables electronically connecting the image sensor to the controller and the processor.

* * * * *